United States Patent [19]

Ward

[11] Patent Number: 4,603,001
[45] Date of Patent: Jul. 29, 1986

[54] APPARATUS AND METHOD FOR FILTERING A FLUID

[76] Inventor: Raymond E. Ward, 1905 N. Valvista Dr., Mesa, Ariz. 85205

[21] Appl. No.: 651,632

[22] Filed: Sep. 13, 1984

Related U.S. Application Data

[63] Continuation of Ser. No. 195,790, Oct. 10, 1980, abandoned.

[51] Int. Cl.⁴ .............................................. B01D 35/24
[52] U.S. Cl. .................................... 210/791; 210/269; 210/353; 210/355
[58] Field of Search ............... 210/791, 106, 269, 289, 210/293, 353, 396, 407, 413, 414, 355, 456, 792, 796, 266, 271

[56] References Cited

U.S. PATENT DOCUMENTS

| 1,749,730 | 3/1930 | Kenney | 210/456 |
| 3,425,562 | 2/1969 | Hamer | 210/353 |
| 4,039,452 | 8/1977 | Fernandez | 210/106 |

Primary Examiner—Ivars C. Cintins
Attorney, Agent, or Firm—Harry M. Weiss & Associates

[57] ABSTRACT

This disclosure relates to a filtering apparatus which incorporates a flow deflector, to divert an incoming flow of the fluid to be filtered, which serves as a device to cause one or more multifaceted bead members to circulate throughout and to impinge upon every surface of an inlet chamber of the filter apparatus so that contaminents tend to be removed from the filter inlet surface portion of the inlet chamber.

2 Claims, 6 Drawing Figures

U.S. Patent  Jul. 29, 1986  4,603,001
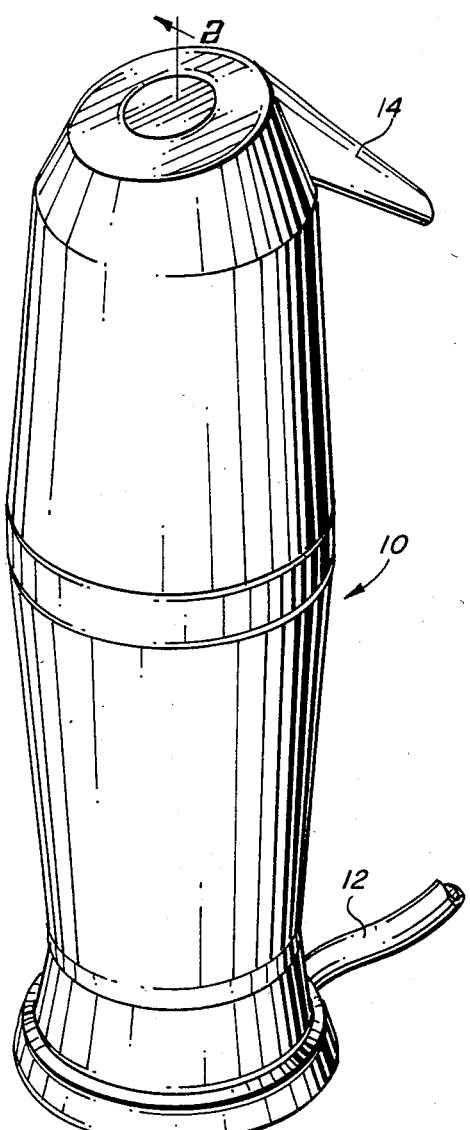
FIG.1
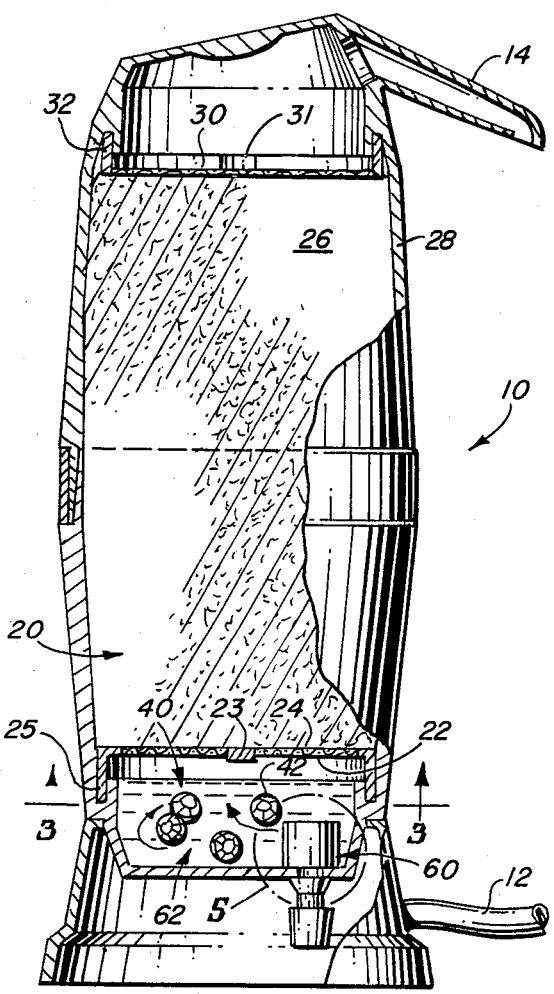
FIG.2
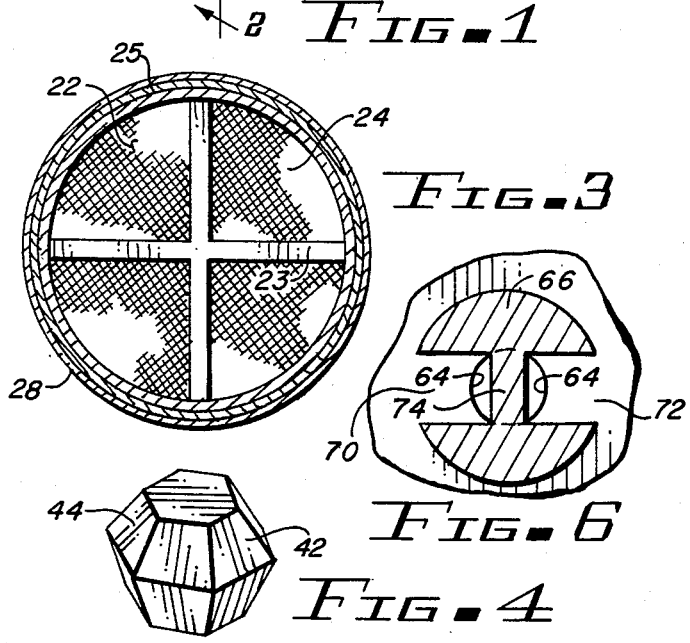
FIG.3
FIG.4
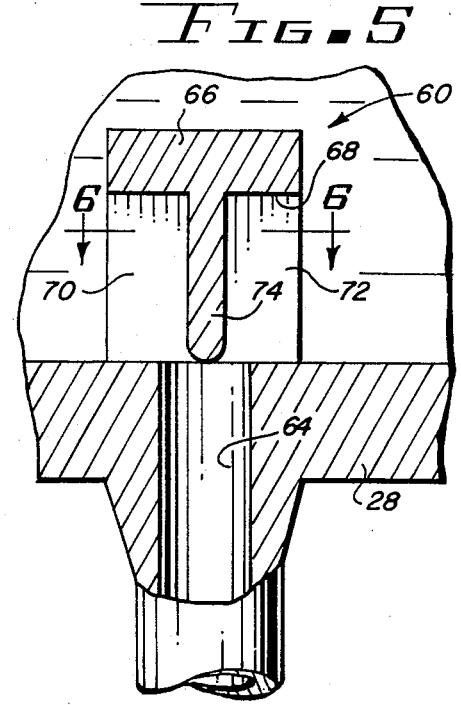
FIG.5
FIG.6

APPARATUS AND METHOD FOR FILTERING A FLUID

This application is a continuation of application Ser. No. 195,790, filed Oct. 10, 1980, now abandoned.

BACKGROUND OF THE INVENTION

1. Field of the Invention

This invention relates generally to fluid filter apparatus, and more specifically, to a water filter apparatus having a deflector over the inflow inlet to cause a circulation of multifaceted mobile members trapped within the inlet chamber to tend to remove contaminants lodged on the inlet surface of the filter apparatus.

2. Description of the Prior Art

In the past various devices have been developed to remove contaminants from a flow of fluid. A common problem among such filters was that after a period of use, the filter, and in particular the filter inlet surface, tended to become clogged with the contaminants removed from the flow. To overcome the problem of filter clogging, various improvements have been made to filters, including those such as described in U.S. Pat. No. 4,039,452, issued on Aug. 2, 1977 to Mr. J. J. Fernandez for a self-cleaning filter. The Fernandez device incorporates a spring-loaded filter pack which automatically back flushes its inlet surface when the flow is terminated, and also incorporates "a number of agitator elements" which are located within an inlet chamber. As indicated beginning at line 45 of Column 4 of the Fernandez patent that device utilizes "agitator elements 44 preferably . . . shaped as round washers each having a central opening. The system pressure during filtering operations causes the agitator elements 44 to spin rapidly and move rapidly in a random motion throughout the inlet chamber 14 as long as system pressure is present in the filter housing. " Notwithstanding the allegation in that patent that the motion of the agitator elements is caused by "pressure" in the filter housing, it would appear that in fact motion of the agitator elements is caused by dynamic pressure gradients created by the flow of the fluid. Although the Fernandez patent does not teach the use of a particular material for the agitator elements, examination of the specification and the respective figures of the drawing of the patent discloses agitator elements in the shape of a common flat washer. Although the Fernandez patent alleges that the flat washers could be started and maintained in motion by "pressure", it would appear that since the bulk of the washers lie substantially within a relatively stable boundary layer, as shown FIG. 2 of the drawing of that patent, an extremely high velocity for the fluid entering the inlet chamber would be required in order to start, and maintain, the agitating members in motion. A need existed for an apparatus for, and method of, keeping the inlet surface of a filter apparatus free of contaminants without requiring a high flow rate entering the inlet chamber.

DESCRIPTION OF THE DRAWING

FIG. 1 is a perspective view of a water filter apparatus.

FIG. 2 is an elevational view of the herein disclosed filter apparatus with portions removed for clarity.

FIG. 3 is a sectional view taken along 3—3 of FIG. 2.

FIG. 4 is an enlarged perspective view of one of the mobile members of the filter apparatus.

FIG. 5 is an enlarged view referenced from numeral 5 of FIG. 2 with portions removed for clarity.

FIG. 6 is a sectional view taken along line 6—6 of FIG. 5.

SUMMARY OF THE INVENTION

In accordance with one embodiment of this invention, it is an object to provide a filter apparatus for removing contaminants from a flow.

It is another object to provide a filter apparatus having a cleaning mechanism for removing contaminants from the inlet surface of the filter apparatus.

It is a further object to provide a filter apparatus having a cleaning apparatus for removing contaminants from the inlet surface of the filter apparatus, which cleaning apparatus is responsive to relatively low rates of fluid flow through the filter apparatus.

It is again another object to provide a filter apparatus having a plurality of multifaceted mobile members having a density approximately equal to the fluid density so that they may be started and maintained in motion by relatively low rates of fluid flow.

It is yet again another object to provide a filter apparatus having a plurality of multifaceted mobile members enclosed within an inlet chamber and also having a deflector apparatus mounted over the inlet aperture into the inlet chamber so that the mobile members are started, and maintained, in motion by relatively low fluid inlet velocities.

DESCRIPTION OF THE PREFERRED EMBODIMENT

In accordance with one embodiment of this invention, a filter apparatus for removing contaminants from a flow of fluid is disclosed, comprising: filter means having an inlet surface for straining contaminants from the flow; cleaning means having at least a mobile member for impinging the mobile member upon the inlet surface so that the contaminants do not accumulate thereupon; and deflector means for deflecting the flow so that the mobile member is maintained in motion.

In accordance with another embodiment of this invention, a method for filtering contaminants from a flow is disclosed, comprising the steps of: providing an inlet chamber with an inlet; providing a first filter with an inlet surface exposed to the inlet chamber; scouring the inlet surface of contaminants lodged thereupon with a vortical motion of the flow; and creating the vortex with a deflector over the inlet.

The foregoing and other objects, features and advantages will be apparent from the following, more particular, description of the preferred embodiments of the invention, as illustrated in the accompanying drawing.

Referring to FIG. 1, a perspective view of a filter apparatus for removing contaminants from a flow of fluids is shown generally by reference number 10. The filter apparatus 10 is provided with an inlet hose 12 which can be coupled to a source of unfiltered fluid, such as a diverter valve attached to the spigot of a water faucet. Typically, the filter apparatus 10 is provided with an outlet spout 14.

Referring then to FIG. 2, an elevational view of the filter apparatus 10 is shown with portions cut away for clarity. The filter apparatus 10 is provided with filter means shown generally by reference number 20, cleaning means shown generally by reference number 40, and deflector means shown generally by reference number 60. The filter means 20, which are provided with an inlet surface 22, are for straining contaminents from the flow. Typically, the filter means are provided with an inlet, or first, filter 24, which has the inlet surface 22, a bed of filter material 26 contained within a case 28, and a second, or final, filter 30, which serves, in combination with the first filter 24 and the case 28, to retain the filter bed 26 within the filter apparatus 10. The cleaning means 40, which are provided with at least a mobile member, or bead, 42, are for impinging the mobile member 42 upon the inlet surface 22 so that those contaminants which are removed from the flow by the filter 24 do not accumulate upon the inlet surface 22. The deflector means 60 are for deflecting the flow so that the mobile member 42 can be started, and maintained, in motion as shown.

Referring then also to FIG. 3, a sectional view taken along line 3—3 of FIG. 2 is shown. In the preferred embodiment of the filter apparatus 10, the first filter 24 is comprised of a woven micronic filter element. Structural support for the first filter 24 is provided by a support frame 23 on the inlet side of the first filter 24. The frame 23 is provided with a peripheral cylindrical portion 25 (refer to FIG. 2) which fits firmly into a corresponding groove in the case 28. The final filter 30 is also preferably provided with a woven micronic filter element and a frame 31 with a peripheral cylindrical portion 32. In this manner, the filter bed 26 may become compressed between the first filter 24 and the final filter 30 to bias the respective frames 23, 31 supporting the first filter 24 and the final filter 30, against the opposite ends of the case 28.

Referring then to FIG. 4, an enlarged perspective view of a single mobile member 42 is shown. The mobile member 42 is provided with a series of facets 44 on its surface. Since the mobile members 42 extend substantially into the inlet chamber, only a very small portion of each member 42 will be boundary layer isolated from any flow. The facets 44 meet at edges and corners, so that when exposed to even a very moderate flow of fluid, the mobile member 42 tends to tumble about its own edges and corners. The mobile member 42 is preferably fabricated from a material having a density incrementally greater than that of the fluid. For example, when the fluid is water the mobile member 42 can be fabricated from a filled plastic material, such as high impact styrene plastic, to provide a specific gravity slightly greater than 1. Referring to FIG. 4, each of the plastic beads or mobile members having a center line and an upper portion and a lower portion. The upper portion has a plurality of planer facets arranged around the perimeter thereof above the center line. The lower portion has a plurality of planer facets arranged around the perimeter thereof below the center line. Each of the plurality of planer facets of the upper portion and each of the plurality of planer facets of the lower portion have four edges. Although the size of the mobile members 42 is a function of the fluid being filtered and the contaminants being removed, in the preferred embodiment of a water filter apparatus 10, the respective mobile members 42 are each 6 to 8 mm. in nominal diameter. The preferred number of mobile members 42 enclosed within an inlet chamber 62 (refer also to FIG. 2) is four. Fewer mobile members 42 tend to reduce the cleaning effectiveness of the mobile members 42, while a greater number tends to interfere with one another and thereby also dampen the cleaning action.

Referring to FIG. 5, an enlarged elevational view referenced from numeral 5 from FIG. 2 is shown, with portions removed for clarity. Referring also to FIG. 2, the structure and operation of the deflector means 60 is shown. The deflector means are comprised of the inlet chamber 62 which is formed by the combination of the case 28 and the inlet surface 22. The case also defines an inlet aperture 64 which provides an opening between the inlet hose 12 and the inlet chamber 62. In the preferred embodiment of the filter apparatus 10, the axis of the inlet aperture 64 is perpendicular to the inlet surface 22. The deflector means 60 are further comprised of a shroud 66 which is situated immediately adjacent the inlet aperture 64. The shroud 66 is provided with a deflector surface 68 which is disposed to divert the flow passing through the inlet aperture 64, thereby minimizing the depth of the boundary layer adjacent the bottom surface of the inlet chamber 62. The deflector surface 68 is rigidly maintained in a plane parallel to the inlet surface 22. In the preferred embodiment of the filter apparatus 10, the shroud 66 is provided with first and second ports 70, 72. The first and second ports 70, 72 are separated by a baffle 74, but are each separately open to the inlet chamber 62 and the inlet aperture 64. The combination of an inlet aperture 64 offset from the longitudinal axis of the filter means 20, and opposed first and second ports 70, 72 each terminating in a deflector surface 68, has been found particularly useful for preventing the mobile members 42 from becoming trapped, away from the inlet surface 22, in an internal backwash in the inlet chamber 62.

The action of the shroud 66 in providing an optimally controlled action of the mobile members 42 has been found particularly effective where the rate of the flow through the inlet aperture 64 is metered, as would be the case in a typical installation of the filter apparatus 10.

Referring then to FIG. 6, a sectional view taken along line 6—6 of FIG. 5 is shown. In FIG. 6, it can be seen that a flow leaving the aperture 64 will be divided by the baffle 74, causing first and second flow portions in and through the respective first port region 70 and the second port region 72.

While the invention has been particularly described and shown in reference to the preferred embodiments thereof, it will be understood by those skilled in the art that various changes in form and detail and omissions may be made therein without departing from the spirit and scope of the invention.

What is claimed is

1. A filter apparatus for removing contaminants from a flow of fluid, comprising:
   filter means having an inlet surface for straining said contaminants from said flow;
   said filter means futher having an inlet chamber including said inlet surface as a boundary thereof;
   cleaning means having a plurality of mobile members trapped within said inlet chamber for impinging said mobile members upon said inlet surface so that said contaminants do not accumulate thereupon;
   deflector means for deflecting said flow so that each mobile member is maintained in motion;
   each of said mobile members comprising a solid plastic bead having a center line and an upper portion and a lower portion, said upper portion having a plurality of planer facets arranged around the perimeter thereof above said center line, said lower portion having a plurality of planer facets arranged around the perimeter thereof below said center line, each of said plurality of planer facets of said upper portion and each of said plurality of planer facets of said lower portion having four edges;

said facets having a nominal equidistant spacing from the center of said bead; and said bead having a substantial projection into said chamber so that said bead is not trapped within a boundary layer of said flow, said fluid comprising water and said bead having a specific gravity greater than one, said bead comprising bead means having multiple corners for increased tumbling action to provide increased cleaning upon the impinging of said bead on said inlet surface of said filter means under a very moderate flow of fluid which prevents the accumulation of contaminants thereon.

2. A method for filtering contaminants from a flow, comprising the steps of:

providing an inlet chamber with an inlet for receiving said flow;

providing a first filter with an inlet surface exposed to said inlet chamber for draining said flow from said inlet chamber;

passing said inlet flow through said inlet surface to trap said contaminants on said surface;

scouring said contaminants from said inlet surface with a vortical motion of said flow;

creating said vortical flow with a deflector over said inlet;

trapping a plurality of solid plastic beads within said inlet chamber, each of said solid beads having a center line and an upper portion and a lower portion, said upper portion having a plurality of planer facets arranged around the perimeter thereof above said center line, said lower portion having a plurality of planer facets arranged around the perimeter thereof below said center line, each of said plurality of planer facets of said upper portion and each of daid plurality of planer facets of said lower portion having four edges;

tipping each of said beads about an edge thereof with said vortical flow;

bouncing said beads against said inlet surface to prevent the accumulation of contaminants thereon; said flwo being a flow of water, each of said beads having multiple corners for increased tumbling action to provide increased cleaning upon the impinging of said beads on said inlet surface under a very moderate flow which prevents the accumulation of contaminants thereon.

* * * * *